United States Patent [19]

Focht

[11] 4,409,548

[45] Oct. 11, 1983

[54] PIEZOELECTRIC APPARATUS FOR GENERATING ELECTRICALLY DISTINGUISHABLE BIPOLAR SIGNALS

[75] Inventor: Louis R. Focht, Farmington Hills, Mich.

[73] Assignee: Ford Motor Company, Dearborn, Mich.

[21] Appl. No.: 280,744

[22] Filed: Jul. 6, 1981

[51] Int. Cl.³ ............................ G01P 3/48; G01P 3/54
[52] U.S. Cl. .................................... 324/168; 324/174; 324/208; 324/392; 73/DIG. 4; 310/339
[58] Field of Search .................. 73/DIG. 4; 310/339; 324/168, 169, 173, 391, 174, 392, 209, 208

[56] References Cited

U.S. PATENT DOCUMENTS

| | | |
|---|---|---|
| 1,980,888 | 11/1934 | Thomas . |
| 2,081,862 | 5/1937 | Williams . |
| 2,749,746 | 6/1956 | Wright ............................ 324/209 X |
| 3,221,213 | 11/1965 | Mckinney ...................... 310/339 X |
| 3,336,529 | 8/1967 | Tygart ............................. 310/339 X |
| 3,488,581 | 1/1970 | Foster . |
| 3,539,841 | 11/1970 | Riff ...................................... 310/339 |
| 3,604,958 | 9/1971 | Palini . |
| 3,608,370 | 9/1971 | Vollenweider et al. . |
| 3,750,127 | 7/1973 | Ayers et al. . |
| 4,030,027 | 6/1977 | Yamada et al. . |
| 4,072,893 | 2/1978 | Huwyler ............................. 324/208 |
| 4,112,365 | 9/1978 | Larson et al. . |
| 4,117,401 | 9/1978 | Glauert . |
| 4,119,911 | 10/1978 | Johnson, Jr. . |
| 4,164,706 | 8/1979 | Akita et al. ......................... 324/208 |
| 4,230,383 | 10/1980 | Burnstein et al. . |
| 4,293,814 | 10/1981 | Boyer ............................. 324/208 X |

Primary Examiner—Stanley T. Krawczewicz
Attorney, Agent, or Firm—Peter Abolins; Clifford L. Sadler

[57] ABSTRACT

This specification discloses an apparatus and method for providing electrically distinguishable signals occurring as a function of the position of a moving element. The electrical signals are generated by a piezoelectric apparatus and can be used to determine a variable such as revolutions per minute of the movable element. Particular ones of the electrically distinguishable signals can be used for initiating a function such as the firing of the spark plugs.

11 Claims, 11 Drawing Figures

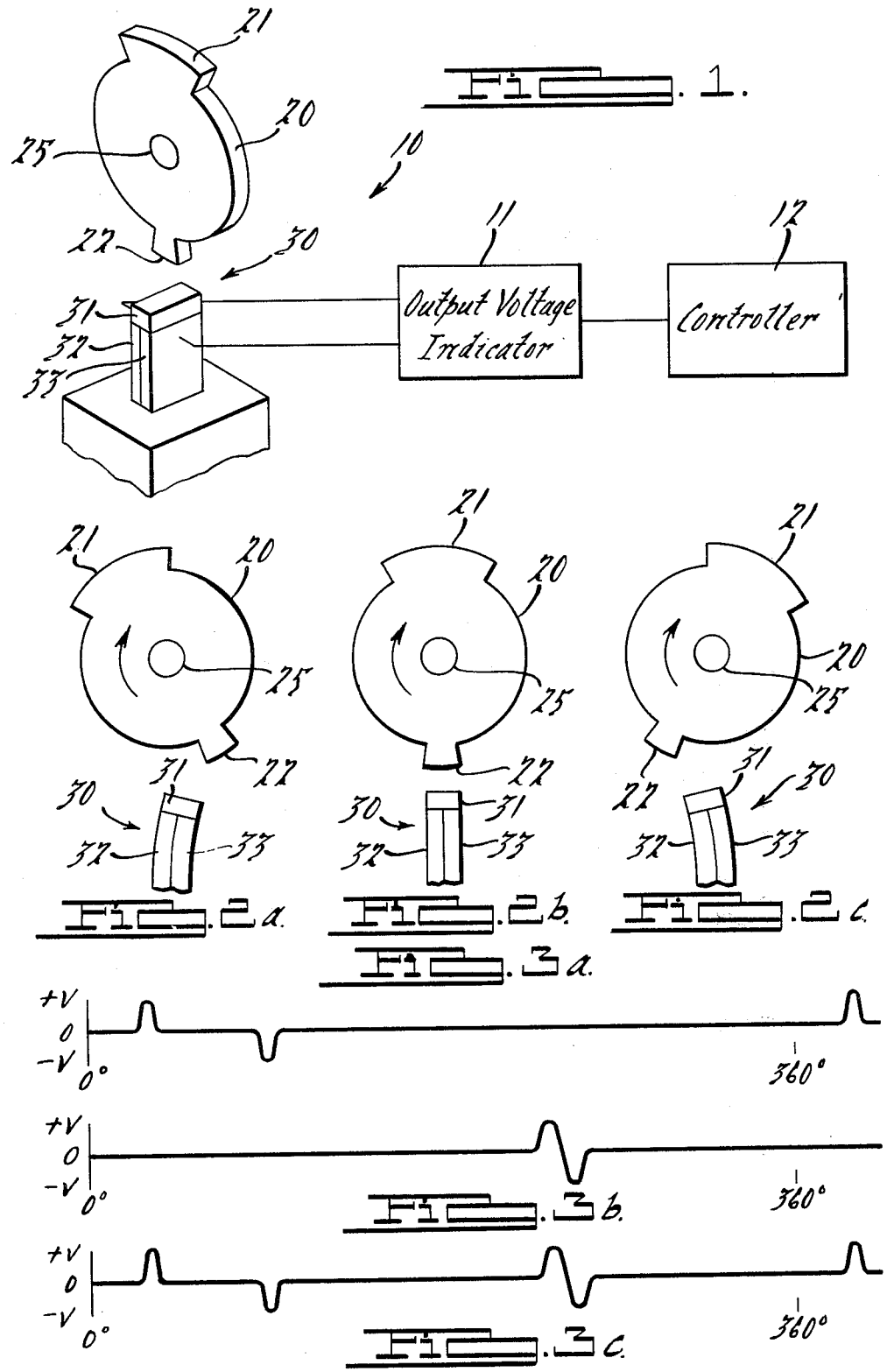

PIEZOELECTRIC APPARATUS FOR GENERATING ELECTRICALLY DISTINGUISHABLE BIPOLAR SIGNALS

BACKGROUND OF THE INVENTION

1. Field of the Invention

This invention relates to an apparatus and method for generating pulses and, particularly, generating pulses indicating the rotational movement and position of a shaft.

2. Description of the Prior Art

It is known in automotive vehicles to have a rotating wheel provide signals representative of the rotation of a crankshaft of an engine. In particular, the wheel can have a number of radially protruding teeth which cause signals to be produced each time they pass a detector. Thus, determining the number of teeth which pass the detector during a given time period can be used to determine the revolutions per minute of the crankshaft. Further, the occurrence of a pulse generated by a tooth indicates that the rotational position of the wheel, and thus the crankshaft, is at one of those positions indicated by the teeth on the wheel.

Signals can also be generated which characterize one particular angular reference position of the crankshaft. Such signals are necessary, for example, to initiate ignition. Although each one of the teeth on the wheel may indicate that an ignition should take place, the reference position is necessary to indicate when the sequence of cylinder firing should start. To generate a reference signal, it is known to make use of an additional wheel having a single protruding tooth and an additional detecting device for detecting the single tooth. Thus, a signal indicating a particular reference position occurs when the receiver detects passing of the single tooth. Such an arrangement is undesirable because there is the additional expense of the assembly of the wheel having a single tooth and the detector. The positioning of the wheel with the single tooth with respect to the other wheel must be done carefully so that there is an accurate angular relationship between the two wheels.

The prior art also teaches attempts at avoiding the necessity for two separate wheels and the attendant disadvantages. In a wheel having a plurality of teeth, one tooth is longitudinally cut to provide two tooth positions with a gap therebetween. If the spacing between adjacent uncut teeth is equal to the width of a tooth, the presence of the cut tooth with the gap can be detected by comparing the duration of the separation between adjacent teeth and the width of the immediately preceding tooth. That is, the spacing separating a cut tooth and adjacent tooth is greater than the width of one of the cut tooth portions.

However, such a scheme also has disadvantages in that the width of the tooth must be sufficiently wide to be cut into two portions and still provide a signal. Thus, the minimum width of the tooth is determined by the ability of a manufacturing process to form two tooth portions out of a single tooth. Further, the counting technique used to determine the presence of a cut tooth is based upon a spacing between adjacent teeth equal to the width of each tooth. Thus, such a system may not be desirable where it is necessary to have relatively narrow pulses which are spaced further apart than the pulse width. Further, relatively elaborate circuitry is required to determine the occurrence of a split tooth. Still further, it would be desirable to be able to establish the position of the reference point without the need for detecting or recognizing any of the other positions denoting angular position.

A further problem which has existed without a completely satisfactory solution is to provide a sufficiently accurate indication of revolutions per minute when only two angular positions of the wheel need be known to determine firing of the cylinders. For example, in a four cylinder engine, two cylinders are fired during each rotation of the wheel. Thus, although only two positions are required on the wheel, the variance in determining the revolutions per minute is sufficient that it is desirable to have additional reference positions on the wheel for more frequent and thus more accurate computation of crankshaft revolutions per minute. One problem has been that these additional reference positions create erroneous spark plug firings. While the signals designating the different reference positions should be different, they should be sufficiently alike in such parameters as magnitude that the apparatus used to detect one signal can easily and efficiently detect the other signal.

In addition to problems associated with determining an advantageous shape for the signal initiating wheel, producing the electrical signal itself has presented problems. Known techniques include the use of Hall effect sensors and wound coils which produce an electric current in response to a changing magnetic field. Typical disadvantages associated with known sensors include insufficient sensitivity and undesirable response to spurious signals. These are some of the problems this invention overcomes.

SUMMARY OF THE INVENTION

This invention teaches a pulse generating apparatus and method for providing electrically distinguishable signals occurring as a function of the position of a relatively movable element. For purposes of electrically distinguishing the signals, they need not have any particular relationship with respect to one another, can be placed in an arbitary angular position with respect to one another and can be detected and distinguished without detection of any other signal. A particular problem which this invention solves is the use of a single wheel coupled to a rotating crankshaft for determining both the revolutions per minute of the crankshaft and determining when the cylinder should be fired. For example, two positions on a rotating wheel can be distinguished from one another.

More specifically, particular positions on a rotating wheel can be determined by detecting a zero crossing output signal caused by a relatively narrow tooth, a positive going signal caused by the leading edge of a relatively wide tooth, a negative going signal caused by the trailing edge of a relatively wide tooth, or a combination of the signals caused by relatively narrow and wide teeth.

Further, in accordance with an embodiment of this invention, a pickup position adjacent the rotation tooth has a magnet attached to a ceramic transducer for generating a piezoelectric voltage. Rotation of the ferromagnetic wheel causes the application of a force on the magnet which, in turn, causes an application of a force on the ceramic transducer attached to the magnet. The particular electrical output of the ceramic transducer depends upon the configuration of the rotating wheel adjacent the magnet. The magnitude of the electrical output is independent of revolution speed. Such a constant output voltage is advantageous because the output circuitry need only have the capability of handling such magnitudes. This simplifies design and reduces cost.

BRIEF DESCRIPTION OF THE DRAWINGS

FIG. 1 is a schematic representation of a pulse generating circuit diagram in accordance with an embodiment of this invention;

FIGS. 2a, 2b and 2c are simplified and enlarged view of the action of the ferromagnetic tooth on the pickup in accordance with an embodiment of this invention;

FIGS. 3a, 3b and 3c are waveform diagrams of the signal generated by the wide tooth, the narrow tooth and the combined output, respectively, of the embodiment of this invention shown in FIG. 1;

DETAILED DESCRIPTION OF THE INVENTION

Figure 4:
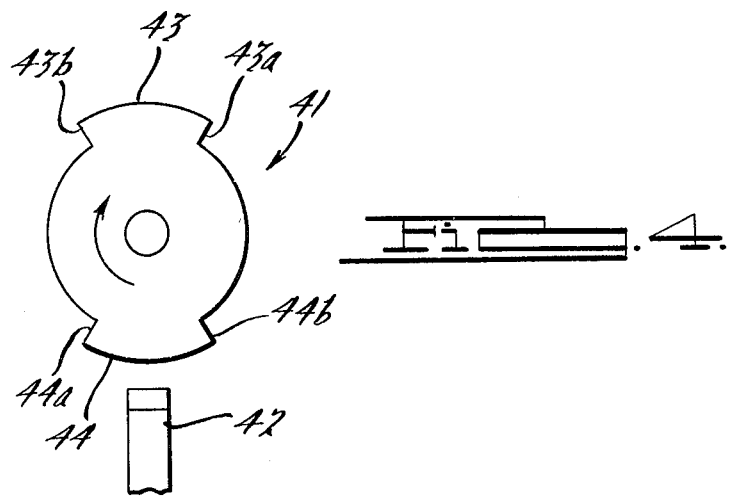
FIG. 4 is a side view of a ferromagnetic wheel with two relatively wide teeth adjacent a piezoelectric pickup in accordance with an embodiment of this invention.

Referring to FIG. 1, a pulse generator 10 includes a ferromagnetic wheel 20 operatively coupled by a magnetic field to a pickup receiver 30 which is electrically connected to the combination of an output voltage indicator 11 and a controller 12. Rotation of wheel 20 produces a change in magnetic flux which is detected by a pickup receiver 30 and communicated as a voltage output to output voltage indicator 11 where the voltages are displayed. Controller 12 performs various functions in response to the signals indicated at output voltage indicator 11. For example, such functions can include computations of revolutions per minute of an engine crankshaft and initiating firing of a cylinder spark plug in an automobile engine.

Wheel 20 has a generally circular shape with a wide tooth 21 protruding from the periphery and a narrow tooth 22 protruding from the periphery of wheel 20 opposing wide tooth 21. Wheel 20 rotates about a central axis 25 so that teeth 21 and 22 pass pickup receiver 30. Teeth 21 and 22 are generally arcuate in shape and have an axis aligned with the radius of wheel 20.

Pickup receiver 30 detects the change in magnetic flux and has an electrical output indicative of the rate of change of flux. More particularly, pickup 30 includes a magnet 31 mounted upon a pair of ceramic transducers 32 and 33. Ceramic transducers 32 and 33 produce a piezoelectric voltage in response to stress. Such stress occurs when magnet 31 moves in response to rotation of wheel 20 thereby causing movement of pickup 30.

More particularly, referring to FIGS. 2a, 2b and 2c, the rotational approach of tooth 22 to magnet 31 causes magnet 31 and the rest of pickup 30 to stress bend to the right. This stress to the right causes ceramic transducers 32 and 33 to produce an electric output of a first polarity. When tooth 22 is directly aligned with the longitudinal axis of pickup 30, magnet 31 is not deflected from its at rest position, there is no stress applied to ceramic transducers 32 and 33 and there is no voltage output. As tooth 22 moves away from magnet 31, magnet 31 tends to follow tooth 22 and causes pickup 30 to bend to the left. This stress to the left causes ceramic transducers 32 and 33 to produce an electric output of a second polarity.

The difference in the effect of narrow tooth 22 versus wide tooth 21 on magnet 31 is best seen in FIGS. 3a, 3b and 3c. As can be seen from the waveforms of FIGS. 3a, 3b and 3c, the magnitude of the electrical signals in response to a passing of a tooth 21 or a tooth 22 are approximately equal in magnitude. However, the time by which a negative going pulse follows a positive going pulse is longer with wide tooth 21 than with narrow tooth 22. That is, the approach of the leading edge of the tooth causes a first shift of magnet 31, the passing of the constant radius section between the leading edge of a tooth and the trailing edge of a tooth causes substantially no bending of pickup 30 and therefore no output, and the passing of a trailing edge of a tooth causes a bending of pickup 30 so as to produce a negative output.

Referring again to FIG. 1, controller 12 forms various functions in response to the electrical signals shown in the waveform of FIG. 3. For example, controller 12 can cause the firing of a spark plug in the cylinder of an automotive engine when the electrical signal in response to a tooth 22 has a zero crossing. The occurrence of such a zero crossing typically would be set to occur 10 degrees before top dead center of the piston associated with the spark plug to be fired. Additionally, a controller 12 can compute the revolutions per minute by determining the number of zero crossings both from tooth 21 and 22 dueing a given period of time.

The availability of a differentiation between the electrical signals produced by a tooth 21 and tooth 22 permits controller 12 to readily decide whether a spark plug should be fired. Further, the fact that the magnitude of the signals from both tooth 21 and 22 can be substantially equal, simplifies the circuitry that controls controller 12 and permits it to handle both signals with equal ease. If one signal was substantially different from the other, the smaller signal will have a substantially worse signal to noise ratio compared to the other signal. This is particularly important when pulse generator 10 exists in an electrically noisy environment such as an automobile.

The configuration of the wheel shown in FIGS. 1 and 2 is particularly advantageous for the firing of a six cylinder engine. That is, firing of a six cylinder engine requires that three distinct positions on the rotating wheel be identifiable. Two cylinders are fired during each rotation. The identifiable positions are indicated by one zero crossing produced by the narrow tooth wheel, the positive going pulses produced by the leading edge of the wide tooth, and the negative going pulse produced by the trailing edge of the wide tooth. It may be advantageous to have the wide tooth extend through the arc of 120°, one third of the periphery of the rotating wheel. Further, it may be advantageous to position the center of the narrow wheel midway between the leading and trailing edge of the wide tooth on the remaining 240° circumference of the rotating wheel. To fire a four cylinder engine, only two positions are necessary which can be accomplished with the use of two narrow teeth. To fire an eight cylinder engine four positions are necessary which may be accomplished with the use of two relatively wide teeth.

Figure 5:
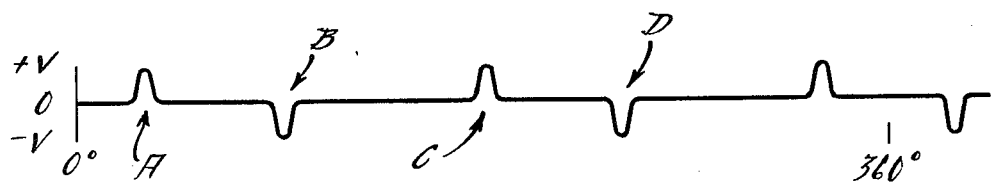
FIG. 5 is an output produced by the apparatus of FIG. 4 with identifiable angular positions indicated by arrows.

Referring to FIG. 4, a wheel 41 is positioned adjacent a piezoelectric transducer 42 and has a pair of wide teeth 43 and 44. Rotation of wheel 41 causes an electrical output from piezoelectric transducer 42 as shown in FIG. 5. More specifically, leading edge 44a of tooth 44 produces the positive going output pulse indicated at point A and trailing edge 44b of tooth 44 produces the negative going output pulse indicated at point B. Similarly, leading edge 43a of tooth 43 produces the positive going output pulse indicated at point C. Trailing edge 43b of tooth 43 produces the negative going output pulse indicated at point D. Advantageously, for firing of an eight cylinder engine the edges of teeth 43 and 44 are equally spaced around the circumference of wheel 41. That is, each tooth then has an angular extent of 90° about wheel 41.

Figure 6:
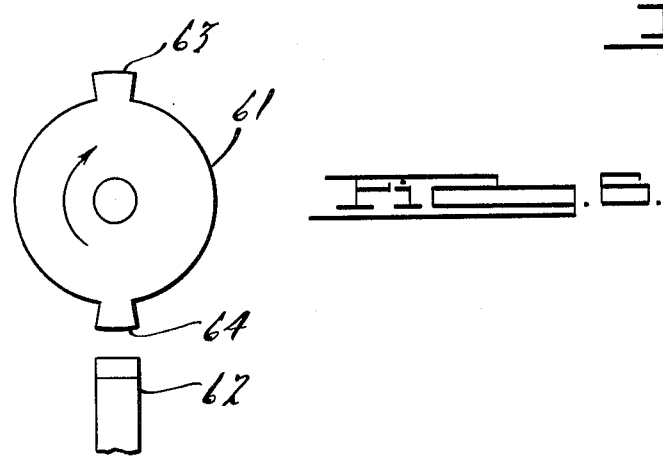
FIG. 6 is a side view similar to FIG. 4 but with relatively narrow teeth.
Figure 7:
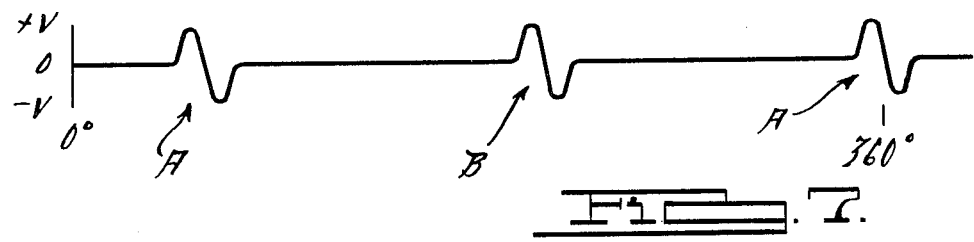
FIG. 7 is an output produced by the apparatus of FIG. 6 with identifiable angular positions indicated by arrows.

Referring to FIG. 6, a wheel 61 is positioned adjacent a piezoelectric transducer 62 and has relatively narrow teeth 63 and 64. The output from piezoelectric transducer 62 from the rotation of wheel 61 is shown in FIG. 7. The signal output of FIG. 7 is suitable for firing a four cylinder engine because two distinct positions are indicated by each wheel rotation. The passing of tooth 64 adjacent piezoelectric transducer 62 produces an output at point A. In particular, there is a rapid rise and fall caused by the leading and trailing edges of tooth 64, respectively, which accurately locates a zero crossing therebetween. Typically, the zero crossing is used as the indicating portion of the output signal. Advantageously, the circumferential extent of narrow teeth 63 and 64 is sufficient so that the positive and negative going signals are relatively close to one another and produce a well defined zero crossing.

Typical parameters for wheel 20 can be a radius of about 2.0 inches with a tooth height of about 0.125 inches. The thickness of wheel 20 can be about 0.20 inches. A typical pickup receiver can have a magnet 31 made of Alnico V having a generally rectangular shape.

Various modifications and variations will no doubt occur to those skilled in the art. For example, the particular shape of the teeth may be varied from that disclosed herein. These and all other variations which basically rely on the teachings through which this disclosure has advanced the art are properly considered within the scope of this invention.

What is claimed is:

1. A pulse generating means for providing electrically distinguishable signals, said signals occurring as a function of position of a relatively moveable element, said pulse generating means comprising:
    a wheel means coupled to said relatively movable element for generating changes in magnetic flux;
    a pickup receiving means located in energy transfer coupling with respect to said wheel means for providing electrically distinguishable signals in response to passage of said wheel means past said pickup means;
    said wheel means including a tooth means extending along a portion of the circumference of said wheel means and projecting toward said pickup means for generating changes in magnetic flux at said pickup as said wheel rotates;
    said pickup receiving means including a permanent magnet, coupled to a piezoelectric ceramic transducer capable of electrically generating a piezoelectric signal of two polarities, said magnet being sufficiently close to a path of rotation for said teeth means so that movement of said teeth means past said pickup receiving means causes a change of magnetic flux and applies a force to said magnet which applies a stress to the ceramic transducer thereby creating a piezoelectric voltage;
    said wheel means including at least one tooth positioned around the circumference of said wheel and having a leading edge and a trailing edge as said wheel rotates so that said leading edge produces a signal of a first polarity and said trailing edge produces a signal of a second polarity, opposite from said first polarity, with an intermediate zero crossing between said signal of said first polarity and said signal of said second polarity; and
    said pickup receiving means including a rigid base for mounting said piezoelectric ceramic transducer thereby providing a cantilevered support for said magnet so that said piezoelectric ceramic transducer can bend in two different directions from an undeflected reference position and produce said first polarity signal by bending in a first direction and said second polarity signal by bending in a second direction.

2. A pulse generating means as recited in claim 1 wherein said wheel means includes a pair of relatively narrow teeth positioned at opposing locations around the circumference of said wheel, said pair of relatively narrow teeth exciting said pickup receiving means to produce a bipolarity signal having an intermediate zero crossing suitable for providing timing information.

3. A pulse generating means as recited in claim 1 wherein said wheel means includes a pair of relatively wide teeth positioned at opposing locations around the circumference of said wheel, said pair of relatively wide teeth exciting said pickup receiving means to produce a signal of a first polarity in response to the passing of a leading edge of a relatively wide tooth and a signal of a second polarity in response to the passing of a trailing edge of a relatively wide tooth.

4. A pulse generating means as recited in claim 1 wherein said wheel means includes a first wide tooth means and a second narrow tooth means of unequal circumferential extent for projecting toward said pickup means for generating changes in magnetic flux at said pickup means as said wheel rotates;
    said wide tooth means causing generation of electrical signals of a first shape and said narrow tooth means causing generation of electrical signals of a second shape, distinguishable from said first shape, each of said teeth means being sufficiently sized to be detected by said receiving means.

5. A pulse generating means as recited in claim 4 wherein said wide tooth means has a circumferential extent of about 120° and said narrow tooth means is centered on the remaining 240° of circumference of said wheel.

6. A pulse generating means for providing electrically distinguishable signals of substantially equal magnitude comprising:
    a rotating, generally circular ferromagnetic member, said pulse generating means providing distinguishable signals occurring as a function of rotational position of said member, said member including a pair of opposing teeth extending outwardly from the generally circular shape of said member along a diameter of said member for rotating and aiding in the generation of the distinguishable signals, a first tooth means being wide and aiding in the generation of a first signal shape and a second tooth being narrow and aiding in the generation of a second signal shape;

said first and second tooth each having a leading edge and a trailing edge as said ferromagnetic member rotates so that said leading edge produces a pulse of a first polarity and said trailing edge produces a pulse of a second polarity, opposite from said first polarity, with an intermediate zero crossing between said pulse of said first polarity and said pulse of said second polarity;

a pickup means located in energy transfer coupling with respect to said ferromagnetic member, including a permanent magnet coupled to a ceramic transducer, said ceramic transducer being mounted to a rigid base and electrically connected to a pair of output wires for producing a piezoelectric voltage in response to stress applied to said ceramic transducer, said magnet being sufficiently close to the path of rotation with said teeth so there is caused a change of magnetic flux adjacent said magnet causing a force to be applied to said magnet, which, in turn, applies a force to said ceramic transducer, said first and second signals having substantially equal magnitude and each having positive and negative going signal portions spaced from each other, the time between occurrence of the signal portions in the first signal being greater than the time between the occurrence of the signal portions in the second signal; and said current transducer being mounted to bend in two different directions from an undeflected reference position and produce said first polarity pulse by bending in a first direction from said reference position and said second polarity pulse by bending in a second direction from said second polarity pulse.

7. Pulse generating means as recited in claim 6 wherein said first wide tooth has a circumferential arc of about 120 degrees.

8. A method of generating electrically distinguishable signals of substantially equal magnitude, including the steps of:

rotating a ferromagnetic wheel member having a generally circular shape and with a pair of protruding teeth;

positioning a pickup including a permanent magnet near the wheel member to provide a flux source for interaction with the wheel member;

varying the magnetic reluctance of a flux path adjacent the permanent magnet by rotational movement of the teeth extending from the wheel member causing a stress to be applied to a ceramic transducer coupled to the permanent magnet and a rigid base thereby generating a piezoelectric voltage, the magnitude and polarity of the voltage depending upon the relative position of the protruding tooth;

adjusting the relative size and position of the wheel member to the magnet by changing the height and size of the teeth so that the magnitude of current flow in response to the first tooth and the second tooth are substantially equal; and detecting the passage of a tooth by an output signal perturbation produced by the pickup and bending the pickup in a first direction from an undeflected reference position to produce a pulse of a first polarity and bending the pickup in a second direction, different from the first direction, from the undeflected reference position to produce a pulse of a second polarity, opposite from the first polarity.

9. A method as recited in claim 8 wherein the step of varying the magnetic reluctance of a flux path includes the steps of:

sequentially passing the periphery of the wheel member associated with a wide tooth past the magnet thereby generating relatively widely spaced positive and negative going pulses; and sequentially passing the periphery of the wheel member associated with the narrow tooth past the magnet thereby generating relatively closely spaced positive and negative going pulses.

10. A method as recited in claim 8 wherein the step of varying the magnetic reluctance of a flux path includes the steps of:

sequentially passing the periphery of the wheel member associated with a pair of wide teeth past the magnet thereby generating pulses in a first direction associated with the leading edges of the wide teeth and pulses in a second direction, opposite from the first direction, associated with the trailing edges of the wide teeth, the four edges of the two teeth being equally spaced at 90° intervals around the circumference of the wheel.

11. A method as recited in claim 8 wherein the step of varying the magnetic reluctance of a flux path includes the steps of:

sequentially passing the periphery of the wheel members associated with a pair of relatively narrow teeth thereby generating bipolar pulses with an intermediate zero crossing, the zero crossing providing a suitable timing reference.

* * * * *